US007929555B2

(12) United States Patent  
Lin (10) Patent No.: US 7,929,555 B2  
(45) Date of Patent: Apr. 19, 2011

(54) METHOD, SYSTEM AND DEVICE FOR INSTRUCTING MEDIA GATEWAY TO SET UP TERMINATION CONNECTIONS

(75) Inventor: Yangbo Lin, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 150 days.

(21) Appl. No.: 12/343,095

(22) Filed: Dec. 23, 2008

(65) Prior Publication Data

US 2009/0103553 A1 Apr. 23, 2009

Related U.S. Application Data

(63) Continuation of application No. PCT/CN2007/070186, filed on Jun. 26, 2007.

(30) Foreign Application Priority Data

Jun. 26, 2006 (CN) .......................... 2006 1 0092615  
Nov. 10, 2006 (CN) .......................... 2006 1 0147195  
May 29, 2007 (CN) .......................... 2007 1 0107372

(51) Int. Cl.  
*H04L 12/66* (2006.01)

(52) U.S. Cl. ........................................ 370/401; 370/467

(58) Field of Classification Search .................. 370/230, 370/235, 252, 400, 401, 466, 467; 709/228, 709/237  
See application file for complete search history.

(56) References Cited

U.S. PATENT DOCUMENTS

| 6,671,367 | B1 * | 12/2003 | Graf et al. ............. 379/229 |
| 7,113,992 | B1 * | 9/2006 | Even ................. 709/227 |
| 7,257,109 | B2 * | 8/2007 | Sylvain ............. 370/352 |
| 7,447,192 | B1 * | 11/2008 | Lehto ............. 370/352 |
| 2003/0193696 | A1 * | 10/2003 | Walker et al. ......... 358/402 |
| 2003/0202521 | A1 * | 10/2003 | Havinis et al. .......... 370/401 |
| 2004/0101125 | A1 * | 5/2004 | Graf et al. ............. 379/229 |
| 2004/0258045 | A1 * | 12/2004 | Groves et al. .......... 370/352 |

(Continued)

FOREIGN PATENT DOCUMENTS

CN 1490973 A 4/2004

(Continued)

OTHER PUBLICATIONS

Cuervo et al., "Megaco Protocol," *IETF Request for Comments*, 1-106 (Sep. 21, 1999).

(Continued)

*Primary Examiner* — Michael J Moore, Jr.  
*Assistant Examiner* — Duc T Duong  
(74) *Attorney, Agent, or Firm* — Leydig, Voit & Mayer, Ltd.

(57) ABSTRACT

A method for instructing a media gateway to set up termination connections is disclosed in embodiments of the present invention. The method comprises: acquiring by a media gateway controller, MGC, information on connection capability, of a media gateway, MG, for various types of terminations; and when a calling connection is required, transmits from the MGC to the MG the connection indication carrying termination connection information that the MG has connection capability, according to the information on the MG's connection capability for various types of terminations. Embodiments of the present invention can ensure that the MG can effectively implement termination connection operation, so as to ensure a smooth progress of a calling connection process and greatly improve quality of service.

18 Claims, 7 Drawing Sheets

U.S. PATENT DOCUMENTS

2005/0105495 A1    5/2005    Hollis et al.

FOREIGN PATENT DOCUMENTS

| | | |
|---|---|---|
| CN | 1509031 A | 6/2004 |
| CN | 1579102 A | 2/2005 |
| CN | 1666549 A | 9/2005 |
| CN | 1708141 A | 12/2005 |
| CN | 1791002 A | 6/2006 |
| CN | 1855914 A | 11/2006 |
| CN | 1870702 A | 11/2006 |
| CN | 1874349 A | 12/2006 |
| CN | 100450116 C | 1/2009 |
| CN | 100542354 C | 9/2009 |
| CN | 100546290 C | 9/2009 |
| WO | WO 02/25896 A2 | 3/2002 |
| WO | WO 03/024052 A1 | 3/2003 |
| WO | WO 2006/048769 A1 | 5/2006 |

OTHER PUBLICATIONS

1st Office Action in corresponding Chinese Application No. 2008101896603 (Nov. 20, 2009).

1st Office Action in corresponding Chinese Application No. 2006100926157 (Apr. 4, 2008).

"H.248.1—Gateway control protocol: Version 3," Series H: Audio-visual and Multimedia Systems—Infrastructure of audiovisual services—Communication procedures, Sep. 2005, International Telecommunication Union, Geneva, Switzerland.

Written Opinion of the International Searching Authority in corresponding PCT Application No. PCT/CN2007/070186 (Oct. 18, 2007).

\* cited by examiner

METHOD, SYSTEM AND DEVICE FOR INSTRUCTING MEDIA GATEWAY TO SET UP TERMINATION CONNECTIONS

CROSS-REFERENCE TO RELATED APPLICATIONS

This application is a continuation of International Patent Application No. PCT/CN2007/070186, filed Jun. 26, 2007, which claims priority to Chinese Patent Application No. 200610092615.7, filed Jun. 26, 2006, Chinese Patent Application No. 200610147195.8, filed Nov. 10, 2006 and Chinese Patent Application No. 200710107372.4, filed May 29, 2007, all of which are hereby incorporated by reference in their entirety.

FIELD OF THE INVENTION

The present invention relates to network communication technology, and, more particularly, to a method, a system, and a device for instructing a media gateway to set up termination connections.

BACKGROUND

At present, soft switching architecture is applied widely. The soft switching architecture separates carrying function from controlling function. The carrying function is implemented by a media gateway, MG. That is, the MG mainly provides an access adaptation function, a media stream conversion function interacting with other networks, and provides specific media resources. While the controlling function is realized by a media gateway controller, MGC. That is, the MGC may control, with signaling, a MG to carry out various service operations, so as to realize control over a calling process.

Figure 1:
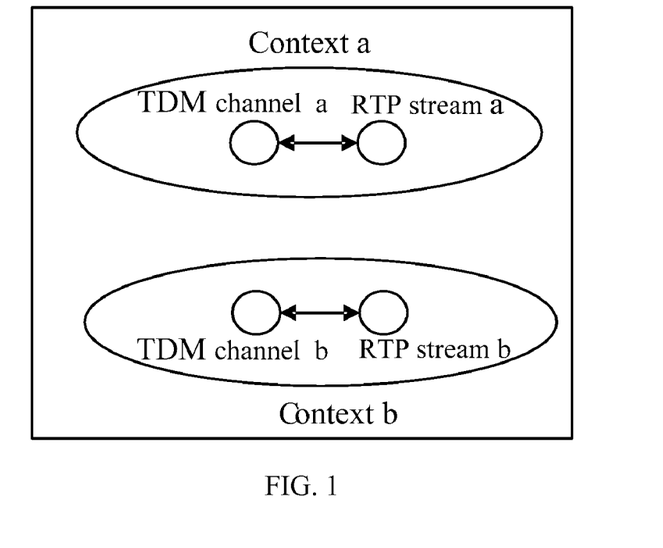
FIG. 1 is a schematic diagram showing that a MG implements termination connections.

An MG is provided with resources required for implementing calls. In the soft switching architecture, resources are abstracted as terminations. Therefore, according to usage of resources, a termination in a MG may be a resource with semi-permanent existence such as time division multiplex (TDM) channels, or a resource that is temporarily applied and released after use, such as real-time transport protocol (RTP) streams. In the soft switching architecture, combination of various terminations is abstracted as a context, that is, the context includes topological relationship among terminations. Thus, for a call, each call connection operation carried out by a MG is practically to connect relevant terminations in the context corresponding to the call. For example, referring to FIG. 1, when a call connection is set up for a calling party a and a called party b, on the MG, resources used by the calling party a, i.e. terminations, include a TDM channel a and a RTP stream a, and resources used by the called party b, i.e. terminations, include a TDM channel b and a RTP stream b. Therefore, when the MG sets up the call connection, it must connect the termination TDM channel a with the termination RTP stream a in the context a corresponding to the calling party a, and connect the termination TDM channel b with the termination RTP stream b in the context b corresponding to the called party b.

As can be seen, the process that a MG sets up termination connection in a context corresponding to a call is an important process in a call connection processes. At present, a MG carries out the termination connection process under the control of a MGC.

Figure 2:
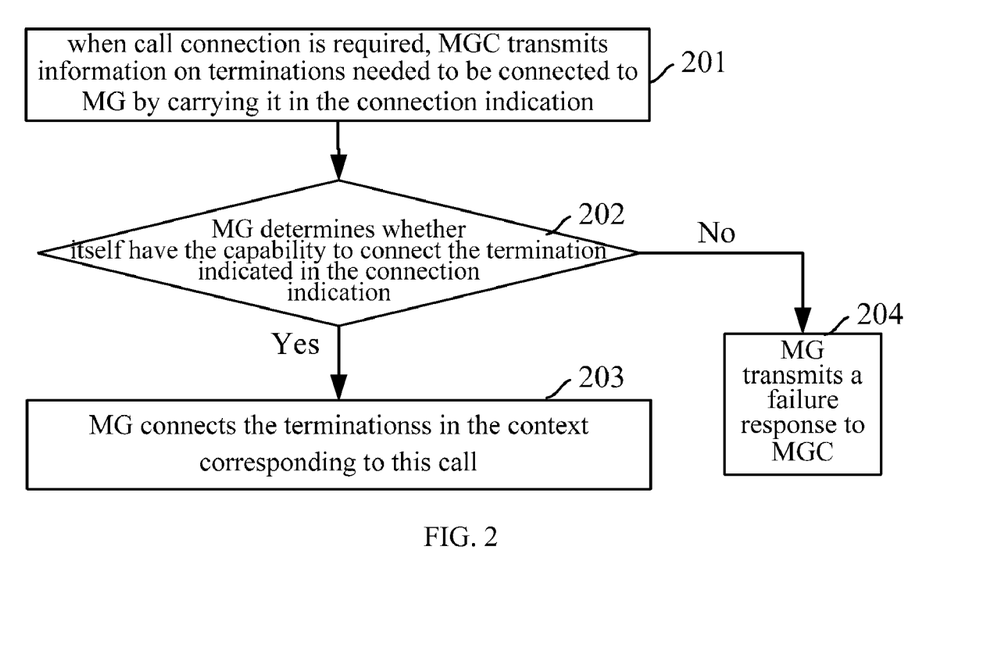
FIG. 2 is a flow chart of instructing a MG to set up termination connections.

FIG. 2 is a flow chart showing a conventional process of instructing a MG to set up termination connections. Referring to FIG. 2, the conventional process of a MGC instructing a MG to set up termination connections includes the following steps.

Step 201: When a call connection is required, the MGC transmits to the MG information on the terminations that need to be connected, by carrying it in a connection indication.

Figure 3:
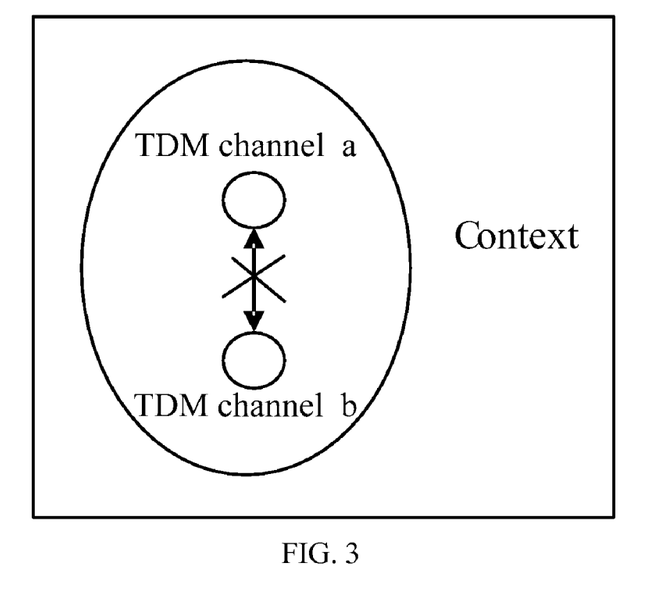
FIG. 3 is a schematic diagram showing that a MG cannot implement connection between two terminations representing TDM channels.

Here, referring to FIG. 3, for example, the MGC carries the termination TDM channel a used by the calling party a and the termination TDM channel b used by the called party b as the information on the terminations that need to be connected into the connection indication, and transmits it to the MG.

Step 202: After the MG receives the connection indication carrying the information on the terminations that need to be connected, the MG determines whether the MG itself has capabilities for connecting the terminations indicated in the connection indication. If so, Step 203 is carried out; otherwise, Step 204 is carried out.

Here, for various types of terminations, the MG has connection capabilities for some types of these terminations, and does not have connection capabilities for others types of these terminations. For example, referring to FIG. 3, the MG has a connection capability for connecting a termination representing TDM channel with a termination representing RTP stream, while does not have a capability for connecting terminations representing two TDM channels due to lacking of related inter-switching logics. At this time, even if the MG receives the connection indication for connecting the termination TDM channel a with the TDM channel b sent from the MGC, this connection operation cannot be implemented.

Step 203: The MG connects the terminations in a context corresponding to the current call, and the current procedure ends up.

Step 204: The MG transmits a failure response to the MGC.

As can be seen from the above, although the MG has a large number of terminations representing various resources, the MG itself may not have the capability to connect any two terminations. However, when a MGC instructs a MG to connect two specific terminations in a conventional manner, whether the MG has the capability to connect the two specific terminations is not taken into account. Therefore, the MG tends to fail to implement the connection operation due to lacking the capability for connecting the two specific terminations, thereby resulting in failure of a call connection and greatly decreasing quality of service.

SUMMARY

Accordingly, a main object of the present invention is to provide a method for instructing a MG to carry out termination connections, so as to ensure that the MG can effectively implement termination connection operations, and that a call connection process is carried out smoothly.

Another main object of the present invention is to provide a system and device for instructing a MG to carry out termination connections, so as to ensure that the MG can effectively carry out termination connection operations and that a call connection process is carried out smoothly.

To achieve the above objects, technical solutions of embodiments of the present invention are implemented as follows.

A method for instructing a media gateway, MG, to carry out termination connections includes: acquiring, by a media gateway controller, MGC, information on the MG's connection capability for various types of terminations; and transmitting a connection indication from the MGC to the MG, according to the information on the MG's connection capability for various types of terminations, when the MGC instructs the MG to carry out termination connections.

A system for instructing a media gateway to carry out termination connections includes a media gateway controller, MGC, and a media gateway, MG, wherein: the MGC is adapted to acquire information on the MG's connection capability for various types of terminations, and transmit a connection indication to the MG, according to the information on the MG's connection capability for various types of terminations when the MGC instructs the MG to carry out termination connections, the connection indication including termination connection information that MG has connection capability; and the MG is adapted to receive the connection indication transmitted from the MGC.

A media gateway controller, MGC, includes a termination connection capability acquiring unit and a termination connection deciding unit, wherein: the termination connection capability acquiring unit is adapted to acquire the information on connection capability, of a media gateway, MG, for various types of terminations, and transmit the information to the connection deciding unit; and the termination connection deciding unit is adapted to transmit a connection indication to the MG, according to the information on the MG's connection capability for various types of terminations when the MGC instructs the MG to carry out termination connections, the connection indication including termination connection information that the MG has connection capability.

A media gateway, MG, includes a termination connection capability auditing request receiving unit, a termination connection capability auditing unit and a termination connection capability response transmitting unit, wherein: the termination connection capability auditing request receiving unit is adapted to receive a termination connection capability auditing request transmitted from a media gateway controller, MGC; the termination connection capability auditing unit is adapted to acquire connection capabilities of corresponding terminations according to the termination connection capability request, and generate a termination connecting capability auditing response carrying information on termination connection configuration description, wherein the termination connection configuration description includes instance identifiers for distinguishing various termination instances; and the termination connection capability response transmitting unit is adapted to return to the media gateway controller a termination connection capability auditing response generated by the termination connection capability auditing unit.

As can be seen, in embodiments of the present invention, the MGC can acquire information on the MG's connection capability for various types of terminations, and the MGC transmits a connection indication to the MG, according to the acquired information on the MG's connection capability for various types of terminations when the MGC instructs to connect two terminations. Thus, it is ensured that the MG can effectively implement termination connection operation, so as to ensure a smooth progress of a calling connection process and greatly improve quality of service.

DETAILED DESCRIPTION

In the prior art, since a MGC does not learn a MG's connection capability for various terminations, when the MG is instructed to connect various terminations, the MG tends to fail to carry out termination connection operations and thus leads to failure of a call connection. In view of this disadvantage, a method for instructing a MG to set up termination connections is provided in embodiments of the present invention. The gist of the method is as follows: a MGC acquires information on a MG's connection capability for various types of terminations; when a call connection is required and the MGC instructs to connect two terminations, the MGC transmits a connection indication to the MG, according to the information on the MG's connection capability for various types of terminations, wherein the information on the MG's connection capability for various types of terminations may be preset in the MGC, or may be configured in the MG and transmitted to the MGC from the MG.

To make objects, technical solutions and advantages of the present invention more clear, a further detailed description will be given for embodiments of the present invention with reference to drawings and specific embodiments.

Embodiment 1

In this embodiment, the implementation of an embodiment of the present invention is described with an example of configuring information on MG's connection capabilities for various terminations in an MGC in advance.

Figure 4:
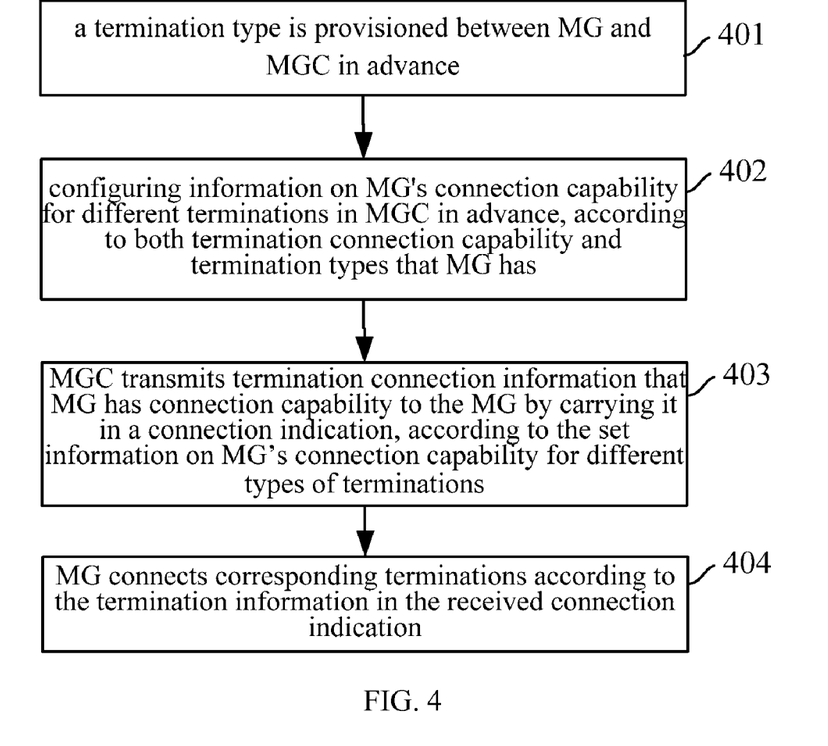
FIG. 4 is a detailed flow chart of a method for instructing a media gateway to implement termination connections, according to a first embodiment of the present invention.

FIG. 4 is a flowchart for a first embodiment of the present invention. Referring to FIG. 4, in the embodiment of the present invention, the process of a MGC instructing a MG to set up termination connections includes the following steps.

Step 401: Termination types are provisioned between the MG and the MGC in advance.

Here, the termination types may include: different termination types representing different resource types, such as a termination type representing RTP streams and a termination type representing TDM channels; and/or different termination types corresponding to different specific resources in one resource type, such as, for the RTP stream type, one termination type corresponding to RTP streams coded with encoding mode 1 and another termination type corresponding to RTP streams coded with encoding mode 2; and further, for the RTP stream resource type, one termination type corresponding to a particular RTP stream for legal listening and another termination type corresponding to a common RTP stream not for legal listening, etc.

Step 402: Information on the MG's connection capability for various types of terminations is set in the MGC in advance, according to both the termination connection capability and the termination types that the MG has.

Here, the set information on the MG's connection capability for various types of terminations may include information on termination connection configuration that the MG supports and/or information on termination connection configuration that the MG does not support, wherein it is recorded, in the information on termination connection configuration that the MG supports, that in which connection direction and for which two types of terminations the MG can perform connection operations; and it is recorded, in the information on termination connection configuration that the MG does not support, that in which connection direction and for which two types of terminations the MG cannot perform connection operations.

For example, both the information on termination connection configuration that the MG supports and the information on termination connection configuration that the MG does not support may be set in form of a triple of "termination type A, termination type B, a direction between termination types A and B," wherein the direction between termination types A and B may be a two-way direction or a one-way direction. In the information on termination connection configuration that the MG supports, if the direction between termination types A and B is a two-way direction, the triple indicates that the MG has the connection capability for connecting terminations of type A to terminations of type B and connecting terminations of type B to terminations of type A; if the direction between termination types A and B is a one-way direction, the triple indicates that the MG has the connection capability for connecting terminations of type A to terminations of type B. In the information on termination connection configuration that the MG does not support, if the direction between termination types A and B is a two-way direction, the triple indicates that the MG has neither the connection capability for connecting terminations of type A to terminations of type B, nor the connection capability for connecting terminations of type B to terminations of type A; and if the direction between termination types A and B is a one-way direction, the triple indicates that the MG does not have the connection capability for connecting terminations of type A to terminations of type B.

In addition, in the triple, the direction between two termination types may be default. If the direction between two termination types is default, it indicates that the direction between these two termination types is a two-way direction. For example, the information on termination connection configuration that the MG supports includes "termination type A, termination type B," which indicates that the MG has the connection capability for connecting terminations of type A to terminations of type B and connecting terminations of type B to terminations of type A.

It should be noted that any one of termination connection configurations can be present in only one of the information on termination connection configuration that the MG supports, and the information on termination connection configuration that the MG does not support, rather than present in both of them.

Step 403: When a calling connection is required, the MGC transmits information on terminations for which the MG has connection capability to the MG by carrying it into a connection indication, according to the information on the MG's connection capability for various types of terminations set in the MGC itself.

Figure 5:
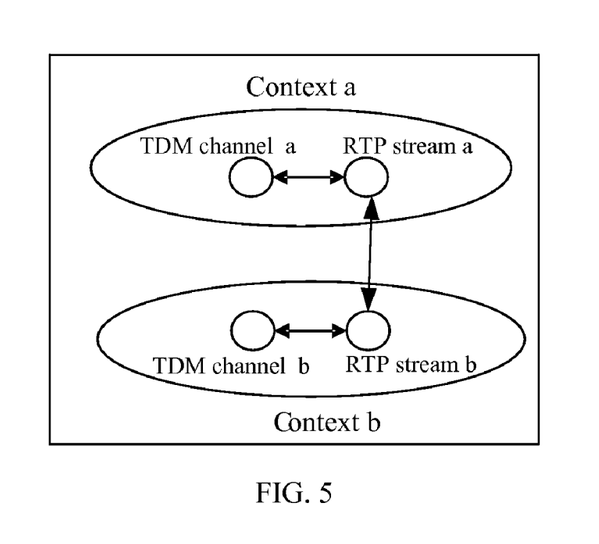
FIG. 5 is a schematic diagram showing that a MG implements termination connection, according to an embodiment of the present invention.

For example, the information on termination connection configuration that the MG supports, which is set in the MGC, includes a triple of "TDM channel RTP stream, RTP stream, two-way," and the information on termination connection configuration that the MG does not support, which is set in the MGC, includes a triple of "TDM channel, TDM channel, two-way." Thus, referring to FIG. 5, when the MGC needs to connect the termination TDM channel a corresponding to the calling party a with the termination TDM channel b corresponding to the called party b, from the triples in the information on termination connection that MG supports and the information on termination connection that the MG does not support, it can be learned that the MG has the connection capability for connecting a termination representing TDM channel with a termination representing RTP stream, but does not have the connection capability for connecting two terminations representing TDM channels. Therefore, the MGC needs to instruct the MG to connect termination TDM channel a with termination RTP stream a in the Context a, connect termination TDM channel b with termination RTP stream b in the Context b, and then connect the RTP stream a with the RTP stream b, so as to realize the call connection between the calling party a and the called party b.

Specifically, the termination connection information carried in the connection indication includes: whether terminations to be connected exist in a same context, and the topological relationship between terminations to be connected. The termination connection information therein is the termination connection information that the MG has the connection capability.

Step 404: The MG connects corresponding terminations, according to the termination connection information in the received connection indication.

Here, referring to FIG. 5, according to the termination connection information in the received connection indication, the MG connects the termination TDM channel a with termination RTP stream a in the Context a, connects termination TDM channel b with termination RTP stream b in the Context b, and then connects the RTP stream a with the RTP stream b, so as to realize the call connection between the calling party a and the called party b.

Figure 6:
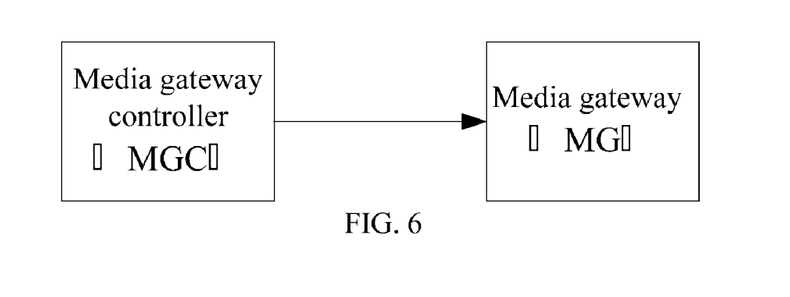
FIG. 6 is a detailed structural diagram of a system for instructing a MG to implement termination connections, according to the first embodiment of the present invention.

The present embodiment also provides a system for instructing a media gateway to set up termination connections, which can be used to implement the procedure of above method. FIG. 6 is a detailed structural diagram of the system, including a MGC and a MG.

In this system, the MGC is adapted to store preset information on the MG's connection capability for various types of terminations, and transmit the termination information that the MG has the connection capability to the MG by carrying it into the connection indication.

The MG is adapted to receive the connection indication sent from the MGC.

Figure 7:
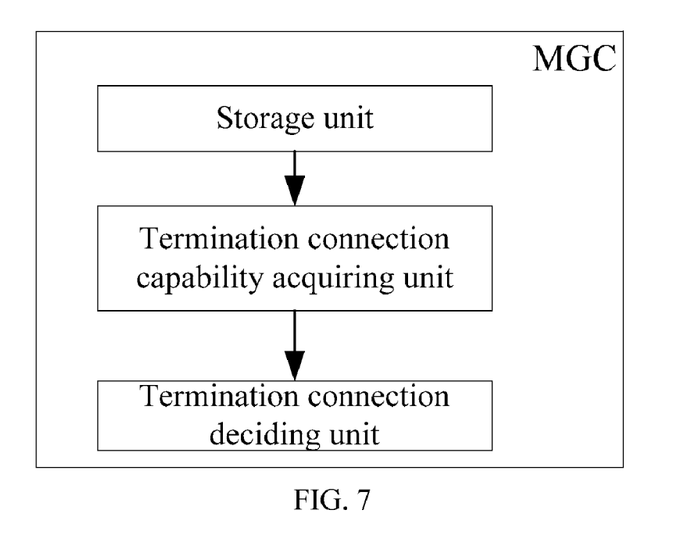
FIG. 7 is a detailed structural diagram of a media gateway controller, according to the first embodiment of the present invention.

The MGC in the above-mentioned system may adopt the structure of FIG. 7. Specifically, as shown in FIG. 7, the MGC includes a termination connection capability acquiring unit, a termination connection deciding unit and a storage unit.

The storage unit in the MGC is adapted to store preset information on the MG's connection capability for various types of terminations, and provide it to the termination connection deciding unit, wherein the set information on the MG's connection capability for various types of terminations may include information on termination connection configuration that the MG supports and/or information on termination connection configuration that the MG does not support. Specifically, the information on termination connection configuration may be set in form of a triple of "termination type A, termination type B, direction between termination types A and B," wherein the direction between termination types A and B may be a two-way direction or a one-way direction.

The termination connection capability acquiring unit is adapted to acquire from the storage unit information on the MG's connection capability for various types of terminations, and provide it to the termination connection deciding unit.

The termination connection deciding unit is adapted to transmit the connection indication to the MG, according to the information on the MG's connection capability for various types of terminations acquired by the termination connection capability acquiring unit, when a call connection is required and the MG is instructed to connect terminations.

Embodiment 2

In this embodiment, the implementation of this embodiment of the present invention is described with an example of configuring information on a MG's connection capability for various terminations in the MG in advance and transmitting it to a MGC.

Figure 8:
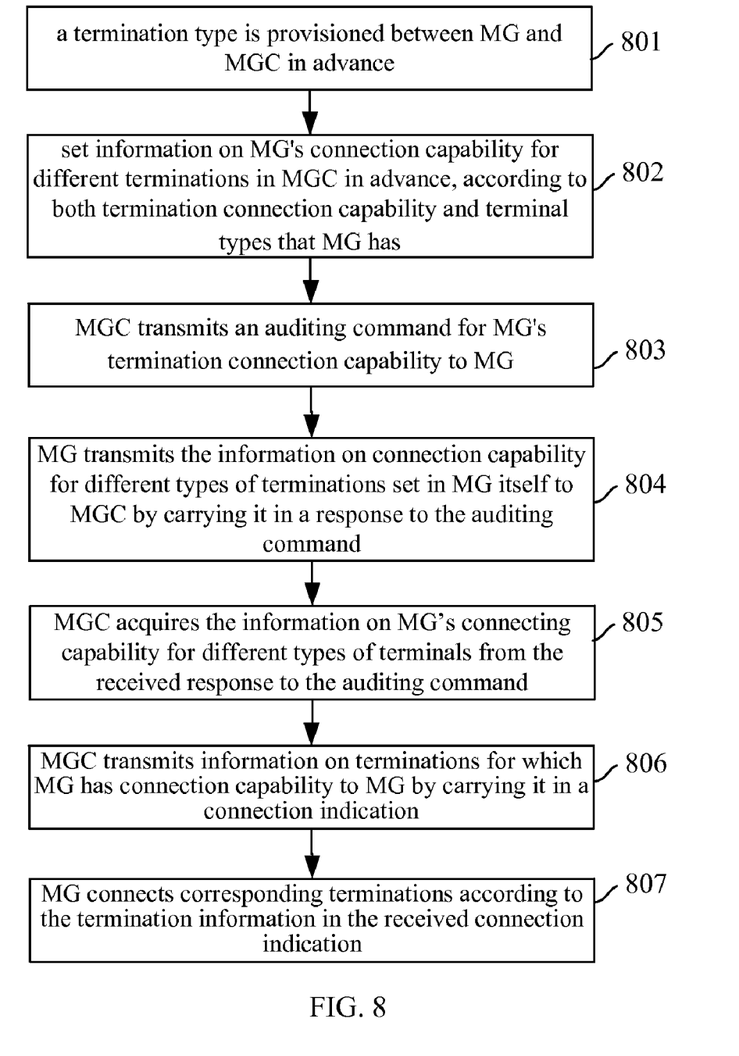
FIG. 8 is a detailed flow chart of a method for instructing a MG to implement termination connections, according to a second embodiment of the present invention.

FIG. 8 is a flowchart for implementing the second embodiment of the present invention. Referring to FIG. 8, in the embodiment of the present invention, the process of a MGC instructing a MG to set up termination connections includes the following steps.

The description in Step 801 is completely identical to that of Step 401.

The process of Step 802 is the same as that of Step 402 except that "set information on the MG's connection capability for various types of terminations in the MGC" in Step 402 is changed to "set information on the MG's connection capability for various types of terminations in the MG" in Step 802, with other description identical.

Step 803: The MGC transmits an auditing command for the MG's termination connection capability to the MG.

Here, the auditing command includes a parameter STC for auditing information on termination connection configuration that the MG supports and/or a parameter NSTC, for auditing information on termination connection configuration that the MG does not support.

Step 804: After receiving the auditing command, according to the checked parameters included in the auditing command, the MG carries the information on connection capability for various types of terminations, which is set in the MG itself, in a response to the auditing command, and transmits it to the MGC.

The implementation of this step may includes: after receiving the auditing command, the MG carries, in the response to the auditing command, the information on termination connection configuration that the MG supports and the information on termination connection configuration that the MG does not support, as values of the checked parameters STC and NSTC, respectively, and transmits it to the MGC. For example, the MG carries "RTP stream, RTP stream, two-way" as the value of STC and "TDM channel, TDM channel, two-way" as the value of NSTC in the response to the auditing command, and transmits it to the MGC.

In addition, in the embodiment of the present invention, the MG may incorporate definite information on termination connection configuration only in the information on termination connection configuration that MG supports or the information on termination connection configuration that MG does not support. For information on termination connection configuration without any definite content, if the MGC checks it via STC or NSTC parameter in the auditing command, the MG sets the corresponding parameter as null, carries it in the response to the auditing command, and transmits it to the MGC.

Step 805: The MGC acquires the information on the MG's connection capability for various types of terminations from the received response to the auditing command.

Here, the MGC determines the information on termination connection configuration that MG supports and the information on termination connection configuration that the MG does not support from the received response to the auditing command, according to values of parameters STC and NSTC. For example, from the STC's value "TDM channel, RTP stream, two-way" and the NSTC's value "TDM channel, TDM channel, two-way" in the response to the auditing command, the MGC learns that the MG has the connection capability for connecting a termination representing TDM channel with a termination representing RTP stream, but does not have the connection capability for connecting two terminations representing TDM channel.

Step 806: When a call connection is required, MGC transmits a connection indication to the MG, according to the acquired information on the MG's connection capability for various types of terminations.

Here, for example, the MGC learns that the MG has the connection capability for connecting a termination representing TDM channel with a termination representing RTP stream, but does not have the connection capability for connecting two terminations representing TDM channels. Therefore, the MGC needs to instruct the MG to connect termination TDM channel a with termination RTP stream a in the Context a, connect termination TDM channel b with termination RTP stream b in the Context b, and then connect the RTP stream a with the RTP stream b, so as to realize the call connection between the calling party a and the called party b.

The description of Step 807 is completely identical to that of Step 404.

In the above-mentioned Steps 803-805, the process of acquiring information on the MG's connection capability for various types of terminations may be carried out every time a call connection is required or may be carried out regularly, and the acquired information on connection capability is stored. In Step 806, the MGC transmits the connection indication, according to the stored information on connection capability.

In the process shown in the above FIG. 8, the MGC may acquire information on the MG's connection capability for various terminations by interfacing the auditing commands and the responses to the auditing commands between MGC and MG. In practical implementation of the embodiments of the present invention, the MGC may also acquire information on the MG's connection capability for various terminations by interfacing other messages, such as self-defined commands and self-defined response messages between the MGC and the MG.

Figure 9:
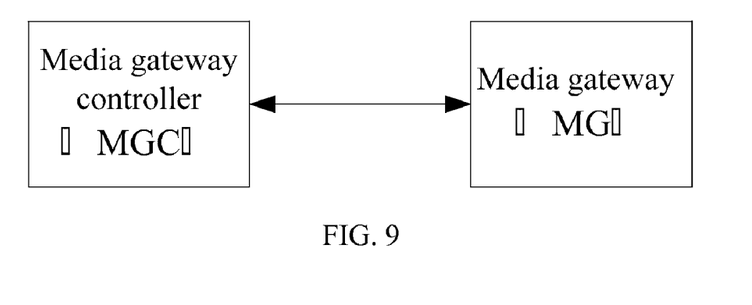
FIG. 9 is a detailed structural diagram of a system for instructing a MG to implement termination connections, according to the second embodiment of the present invention.

The present embodiment also provides a system for instructing a media gateway to set up termination connections, which can be used to implement the procedure of above method. FIG. 9 is a detailed structural diagram of the system, including a MGC and a MG.

In this system, the MGC is adapted to transmit to the MG a command for acquiring termination connection capability, and carry information on terminations for which the MG has connection capability in a connection indication and transmit it to the MG, according to the information on the MG's connection capability for various types of terminations returned by the MG, when a call connection is set up and the MG is instructed to connect terminations.

The MG is adapted to receive the request for termination connection capability sent by the MGC, and generate a termination connection capability response carrying information on termination connection configuration. The MG is further adapted to receive the connection indication sent from the MGC.

Figure 10:
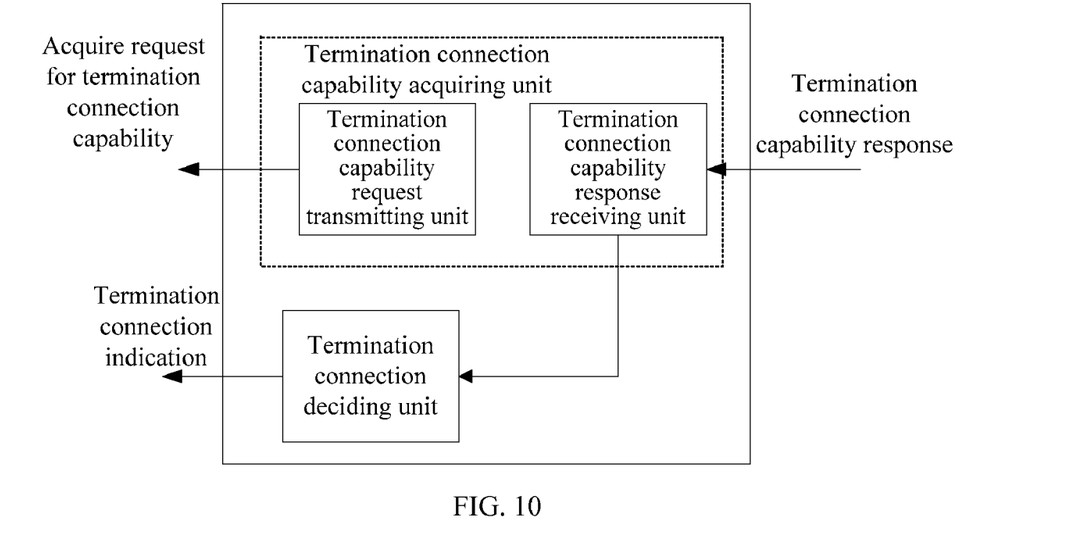
FIG. 10 is a detailed structural diagram of a media gateway controller, according to the second embodiment of the present invention.
Figure 11:
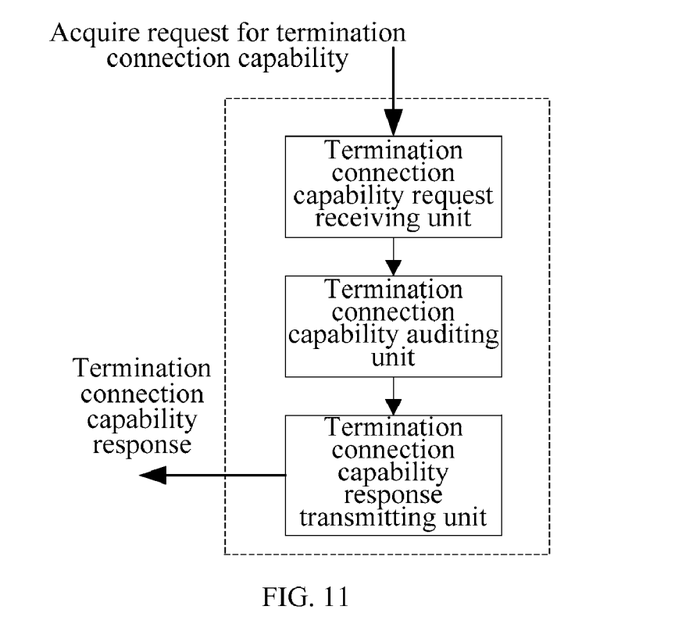
FIG. 11 is a detailed structural diagram of a media gateway, according to the second embodiment of the present invention.

In the above-mentioned system, the MGC and MG can adopt the specific structure shown in FIGS. 10 and 11, respectively. The MGC and MG in the above two figures are respectively a specific implementation of the MGC and MG provided in the embodiments of the present invention.

As shown in FIG. 10, the MGC includes a termination connection capability acquiring unit and a termination connection deciding unit, and the termination connection capability acquiring unit includes a termination connection capability request transmitting subunit and a termination connection capability response receiving subunit.

The termination connection capability request transmitting subunit is adapted to transmit to MG a command for acquiring termination connection capability. The termination connection capability response receiving subunit is adapted to receive information on the MG's connection capability for various types of terminations returned by the MG.

The termination connection deciding unit is adapted to carry the information on terminations for which the MG has connection capability in a connection indication and transmits it to the MG, according to the information on the MG's connection capability for various types of terminations, when a call connection is required and the MG is instructed to connect terminations.

Preferably, the MGC in the present embodiment may further include a storage unit, and the termination connection capability acquiring unit stores the information on the MG's connection capability for various types of terminations returned by the MG into the storage unit. The storage unit is adapted to store the information on the MG's connection capability for various types of terminations, and provide it to the termination connection deciding unit when a call connection is required.

As shown in FIG. 11, the MG includes a termination connection capability request receiving unit, a termination connection capability auditing unit, a termination connection capability response transmitting unit, and a connection indication receiving unit.

The termination connection capability request receiving unit is adapted to receive a termination connection capability request sent by the MGC. The termination connection capability auditing unit is adapted to acquire the corresponding termination's connection capability according to the termination connection capability request, and generate a termination connection capability response carrying information on termination connection configuration. The termination connection capability response transmitting unit is adapted to return to the media gateway controller the termination connection capability response generated by the termination connection capability auditing unit. The connection indication receiving unit is adapted to receive the connection indication sent by the MGC.

In the first and second embodiments, the information on termination connection configuration acquired by the MGC is represented in form of a triple including termination type A, termination type B, and the direction between termination types A and B.

However, the triple form of the above-mentioned similar topology only describes a connection configuration mode between a pair of terminations. When the number of terminations to be described increases, for example, a conference involving multiple parties, especially large number of terminations, or call session scenarios, such as multicast, the corresponding number of termination pairs almost increases in geometric index, and eventually leads to huge number of these descriptions and burden transmission and processing. For example, for 10 terminations, 45 pairs of two-way or 90 pairs of one-way connection configuration modes need to be described accordingly.

Preferably, for a conference involving multiple parties or call session scenarios such as multicast, the MG can describe its connection configuration information on various types of terminations with the maximum number of various types of terminations allowed in a call session scenario, and the MGC then carries out termination configuration, according to this connection configuration information. The implementation of describing information on termination connection configuration with maximum number of termination types and supporting the MGC's reasonable configuration for the MG will be described below with reference to the third embodiment.

Embodiment 3

In this embodiment, an implementation of describing information on termination connection configuration with maximum number of termination types is described with an example of a MGC requesting to a MG for acquiring information on termination connection configuration. Of course, as can be seen from the aforementioned first embodiment, for the case of configuring the information on the MG's termination connection configuration in the MGC in advance, the mode of describing information on connection configuration described in the present embodiment is still applicable.

In the present embodiment, when the MGC requests to the MG for acquiring the MG's connection capability for various types of terminations, descriptor identifier corresponding to descriptor lists may be added in the request command, according to various call session scenarios, and alternatively, descriptor identifier may not be definitely specified. When responding to the MGC's request for connection capability for various types of terminations, the MG may use the combination of a triple list of "termination type A, termination type B, direction between termination types A and termination type B" similar to topological descriptor for general scenarios and/or a two-tuple list of "termination type, number of this termination type" similar to conference descriptor for conference scenarios and/or a triple list of "termination type A, termination type B, number from termination type A to termination type B" similar to multicast descriptor for multicast scenarios, according to the received descriptor identifier, or according to its own practical capability in case of no definitely specified descriptor identifier.

The descriptor identifier corresponding to the triple list of "termination type A, termination type B, direction between termination type A and termination type B" similar to a topological descriptor may be Topology or TP for short. The descriptor identifier corresponding to the two-tuple list of "termination type, number of this termination type" similar to a conference descriptor may be Conference or CNF for short. The descriptor identifier corresponding to the triple list of "source termination type, destination termination type, maximum number of destination termination types" similar to a multicast descriptor may be Multicast or MLT for short.

The MG in the termination configuration system of the present embodiment can transmit the maximum number of allowed corresponding types of terminations in call session scenarios involving multiple parties in form of the above mentioned conference descriptor, and/or multicast descriptor and/or topological descriptor to the MGC, according to the MGC's request.

Figure 12:
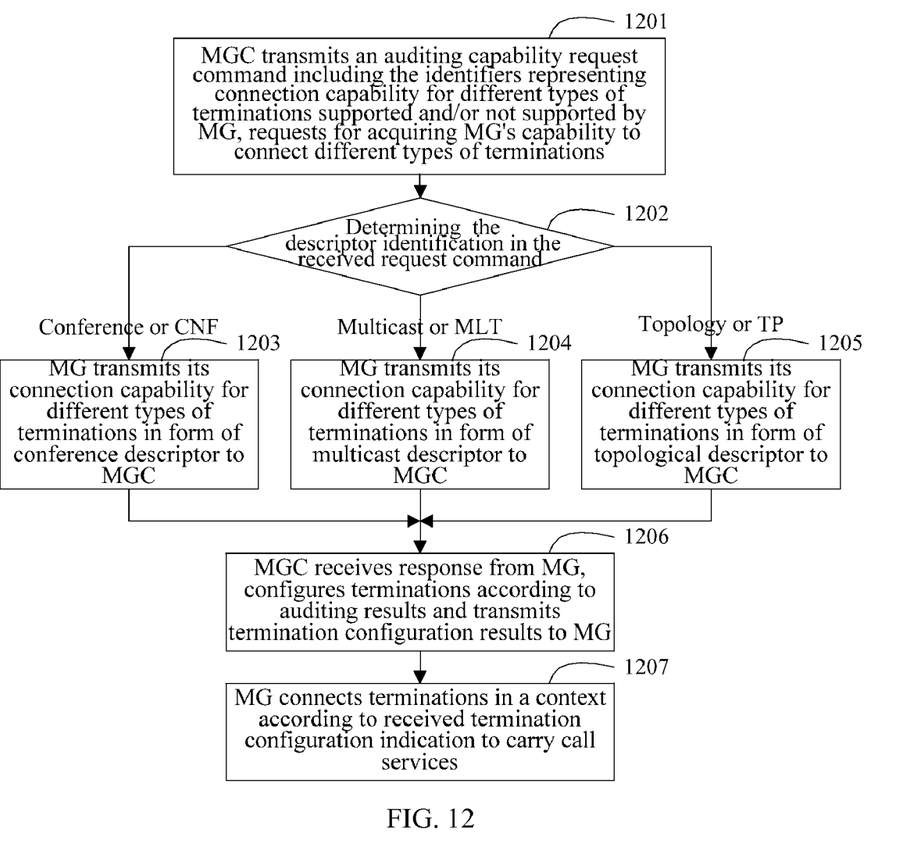
FIG. 12 is a detailed flow chart of a method for instructing a MG to implement termination connections, according to a third embodiment of the present invention.

FIG. 12 is a flowchart for instructing a MG to carry out termination connection method in the present embodiment. As shown in FIG. 12, the termination configuration method in this implementation includes the following steps.

Step 1201: A MGC transmits an auditing capability request command, including the identifiers representing connection capability for various types of terminations, that is supported and/or not supported by the MG, and requests for acquiring the MG's connection capability for various types of terminations.

In this step, if the call session scenario corresponding to the call connection currently required to be configured is a conference scenario, the descriptor identifier is Conference or CNF. If the call session scenario corresponding to the call connection currently required to be configured is a multicast scenario, the descriptor identifier is Multicast or MLT. In other cases, the descriptor identifier is Topology or TP.

If a plurality of call session scenarios correspond to the call connection required to be set up by the MGC, the request command includes one or more corresponding descriptor identifiers.

Step 1202: After the MG receives from the MGC the auditing capability request command, including identifiers representing the connection capability for various types of terminations that is supported and/or not supported by the MG, the MG may determine the descriptor identifier in the received request command. If the descriptor identifier is Conference or CNF, Step 1203 is carried out. If the descriptor identifier is Multicast or MLT, Step 1204 is carried out. If the descriptor identifier is Topology or TP, Step 1205 is carried out.

In this step, if the request command includes three descriptor identifiers or any two of them, or if the request command transmitted by the MGC does not definitely specify a certain descriptor identifier, then the corresponding steps in Steps 1203-1205 are carried out simultaneously.

For example, if the request command includes CNF and TP, Steps 1203 and 1205 are carried out simultaneously.

Still as an example, if the request command does not include any one of the identifiers and the MG itself can only support the conference scenario, Step 1203 is carried out. If the MG can support all call connection scenarios, Steps 1203, 1204, and 1205 are carried out simultaneously.

Step 1203: The MG transmits its connection capability for various types of terminations in form of conference descriptor to the MGC and responds to the MGC's request, and then Step 1206 is carried out.

In this step, the conference descriptor for a conference scenario may be a list comprised of one or more two-tuples of "termination type, number of this termination type."

For example, a conference descriptor including only one two-tuple of "*, 20" indicates that up to 20 terminations are allowed in the conference, and "*" means that the termination type is arbitrary. The conference descriptor at this time only defines the number of terminations.

Still as an example, a conference descriptor including two two-tuples with wildcards of "*, 30, TDM/*, 10" indicates that up to 30 terminations and no more than 10 TDM terminations are allowed in the conference, and "*" means that the termination type is arbitrary. The conference descriptor at this time defines the number of terminations and types of a portion of terminations.

As another example, a conference descriptor including a list of multiple two-tuples of "termination type 1, 20," "termination type 2, 30," . . . , "termination type n, 5" indicates that up to 20 terminations of type 1, up to 30 terminations of type 2, . . . , and up to 5 terminations of type n are allowed in the conference. The conference descriptor at this time defines types of terminations and the number of each type of terminations.

Step 1204: The MG transmits its connection capability for various types of terminations in form of a multicast descriptor to the MGC, responds to the MGC's request, and then Step 1206 is carried out.

In this step, the multicast descriptor for a multicast scenario may be a list comprised of one or more triples of "source termination type, destination termination type, a maximum number of destination termination types."

For example, a multicast descriptor including only one triple of "*, *, 20" indicates that up to 20 destination terminations are allowed in the multicast, and "*" means that the termination type is arbitrary. The multicast descriptor at this time only defines the number of terminations.

As another example, a multicast descriptor including two triples with wildcards of "*, *, 30, *, TDM/*, 10" indicates that up to 30 destination terminations and no more than 10 TDM destination terminations are allowed in the multicast, and "*" means that the termination type is arbitrary. The multicast descriptor at this time defines the number of terminations and types of a portion of terminations.

As another example, a multicast descriptor including a list of multiple triples of "termination type 1, termination type 2, 20," "termination type 3, termination type 4, 30," . . . , "termination type n−1, termination type n, 5" indicates that terminations of type 1 to up to 20 terminations of type 2, terminations of type 3 to up to 30 terminations of type 4, . . . , and terminations of type n−1 to up to 5 terminations of type n are allowed in the multicast. The multicast descriptor at this time defines types of terminations and the number of each type of terminations.

Step 1205: The MG transmits its connection capability for various types of terminations in form of topological descriptor to the MGC, responds to the MGC's request, and then Step 1206 is carried out.

In this step, the topological descriptor for a general scenario may be a triple of "termination type A, termination type B, direction between termination types A and B," wherein the so-called general scenario is a point to point communication scenario.

Step 1206: The MGC receives a response from the MG, configures terminations according to auditing results, and transmits the termination configuration results to the MG.

If in Step 1201, the request command transmitted by the MGC includes a plurality of descriptor identifiers or the request command transmitted by the MGC does not definitely specify a certain descriptor identifier, then, in this step, the received response command includes a plurality of corresponding descriptors.

Step 1207: The MG connects terminations in a context, according to the received termination configuration instruction to carry call services.

Up to now, the procedure ends.

The above-mentioned procedure is an interaction process of the MGC with one MG; and the above-mentioned procedure is also applicable for termination configuration corresponding to other call session scenarios involving multiple parties other than a conference or a multicast.

The above-mentioned method procedure shown in FIG. 12 may be implemented in a system, a MGC, and a MG, shown in FIGS. 9, 10, and 11, respectively.

In the above three embodiments, when describing information on termination connection configuration, if the description on termination type and subtype uses wildcards and terminations with same types and subtypes but different connection relationship are included in one context, the MGC that has acquired the information on connection configuration cannot distinguish different terminations, and therefore cannot obtain information on a specific capability for each termination. For example, in one context, three RTP types of terminations (termination 1, termination 2, and termination 3, respectively) are allowed, wherein termination 1 and termination 2 may be connected in a two-way direction, termination 3 can only receive in a one-way direction from termination 2, and there is no connection between termination 3 and termination 1. In term of relationship between two terminations, the connection configuration between terminations 1 and 2 may be described as "RTP/*, RTP/*, Bothway," the connection configuration between terminations 2 and 3 may be described as "RTP/*, RTP/*, Oneway," and the connection configuration between terminations 1 and 3 may be described as "RTP/*, RTP/*, Isolate." However, when these three groups are brought together to describe termination connection configuration in this context, since respective terminations are not distinguished but generalized as RTP/*, contradiction and confusion are caused. Therefore, the MG cannot feed back termination connection configuration to the MGC correctly, and the MGC cannot check termination connecting capability properly and, thus, cannot instruct termination connection properly, according to the termination connection configuration.

In view of this, information on termination connection configuration in the embodiments of the present invention further includes instance identifiers for distinguishing various terminations. Thus, even if the acquired information on termination connection configuration involves the case that multiple terminations of same type or subtype are included in one context, the MGC can obtain information on connection capability for various terminations. An implementation of an embodiment of the present invention when the information on termination connection configuration includes instance identifiers will be described below with reference to the fourth embodiment.

Embodiment 4

Figure 13:
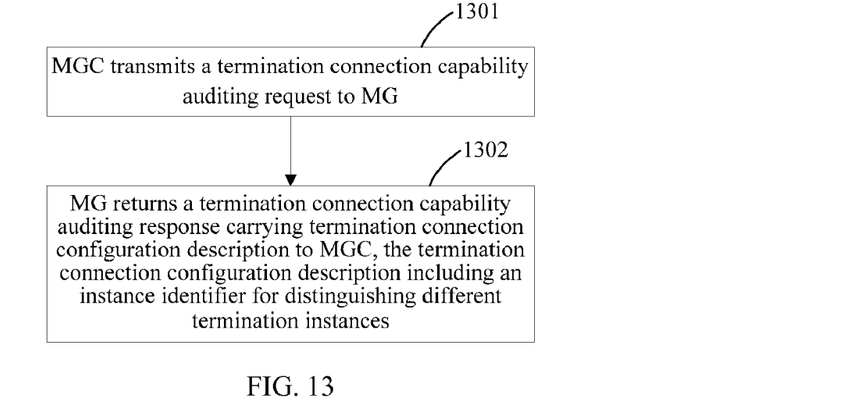
FIG. 13 is a detailed flow chart of a method for instructing a MG to implement termination connections, according to a fourth embodiment of the present invention.

FIG. 13 is a detailed flow chart of a method for instructing a MG to carry out termination connections, according to the fourth embodiment of the present invention. As shown in FIG. 13, the method includes the following steps.

Step 1301: The MGC transmits a termination connection capability auditing request to the MG.

Step 1302: The MG returns a termination connection capability auditing response, including termination connection configuration description to the MGC, the termination connection configuration description including an instance identifier for distinguishing among various termination instances.

In the above procedure, the method may further include: resolving by the MGC termination connection configuration descriptions corresponding to various termination instances from the termination connection capability auditing response, according to the instance identifier, transmitting a termination connection indication to the MG, according to the termination connection configuration descriptions, and connecting by the MG terminations in a context, according to the termination connection indication.

In the present embodiment, various termination instances are distinguished by adding an instance identifier (Instance ID) in the information on termination connection configuration.

The instance identifier as an optional parameter is associated with a termination type in the triple. Instance Y of termination type X is preferably represented in form of "termination type X [instance identifier Y]." The instance identifier is preferably a valued type of integer.

Specifically, (1) for the form of triple of "termination type A, termination type B, direction between termination types A and B" for a general scenario, the termination connection configuration description includes: a first termination type, a first termination instance identifier, a second termination type, a second termination instance identifier, a connection way between the first termination type and the second termination type, and connection direction indicating connecting from the instance of the first termination type to the instance of the second termination type. The first termination type and the second termination type may be different or same. Termination types may include not only physical terminations, such as TDM channels, but also temporary terminations, such as RTP streams.

(2) For the form of two-tuple of "termination type, maximum number" for a conference scenario, the termination connection configuration description includes: termination type, termination instance identifier, and maximum number, indicating the maximum number allowed when the instances of this termination type are numbered from the termination instance identifier with a numbering rule of increment by one.

(3) For the form of triple of "source termination type, destination termination type, maximum number of destination termination types" for a multicast scenario, the termination connection configuration description includes: source termination type, source termination instance identifier, destination termination type, destination termination instance identifier, and maximum number of destination termination types, indicating the maximum number of instances of the destination termination type, which can receive the instance multicast from the source termination types, allowed when instances of the destination termination type are numbered from the destination termination instance identifier with a numbering rule of increment by one.

For example, one context is allowed to include three terminations of RTP type (termination 1, termination 2, and termination 3, respectively), wherein termination 1 and termination 2 may be connected in a two-way direction, termination 3 can only receive in a one-way direction from termination 2, and there is no connection between termination 3 and termination 1. In the embodiment of the present invention, terminations 1, 2, and 3 may be used as termination instance 1, instance 2, and instance 3 of RTP type. Then, the connection configuration between terminations 1 and 2 may be described as "TP{RTP/*[1], RTP/*[2], Bothway}," the connection configuration between terminations 2 and 3 may be described as "TP{RTP/*[2], RTP/*[3], Oneway}," and the connection configuration between terminations 1 and 3 may be described as "TP{RTP/*[1], RTP/*[3], Isolate}," wherein "TP" is the topological identifier.

If the three terminations allowed to be included in the one context in the above example may be further of arbitrary type, then the connection configuration between terminations 1 and 2 may be described as "TP{*[1], *[2], Bothway}", the connection configuration between terminations 2 and 3 may be described as "TP{*[2],*[3], Oneway}," and the connection configuration between terminations 1 and 3 may be described as "TP{*[1], *[3], Isolate}."

For example, one context is allowed to include five terminations of RTP type (termination 1, termination 2, termination 3, termination 4, and termination 5, respectively), wherein terminations 1, 2, and 3 are connected in a conference mode, and termination 3 may multicast to terminations 4 and 5. In an embodiment of the present invention, terminations 1, 2, 3, 4, and 5 may be used as termination instance 1, instance 2, instance 3, instance 4, and instance 5 of RTP type. Then, the connection configuration among terminations 1, 2, and 3 may be described as "CNF{RTP/*[1], 3}," the connection configuration among terminations 3, 4, and 5 may be described as "MLT{RTP/*[3], RTP/*[4], 2," wherein "CNF" is the conference identifier and "MLT" is the multicast identifier.

As can be seen, terminations are distinguished by adding instance identifiers. Therefore, even if wildcards are used for descriptions of termination types and subtypes, one context can include terminations with same type and subtype but different connection relationship, which may not cause contradiction and confusion. Therefore, the MG can feed back termination connection configuration correctly to the MGC, and the MGC can instruct termination connection properly, according to the information on termination connection configuration.

The present embodiment also provides a system for instructing a MG to set up termination connections, which can be used to implement the above method procedure shown in FIG. 13. The system may adopt the specific structure as shown in FIG. 9.

The MGC is adapted to transmit a request for acquiring termination connection capability to the MG, resolve the information on termination connection configuration corresponding to different termination instances from the returned termination connection capability response, and transmit a termination connection indication to the MG according to the information on termination connection configuration.

The MG is adapted to return to the MGC a termination connection capability response carrying information on termination connection configuration, the information on termination connection configuration including instance identifiers for distinguishing various termination instances.

Similarly, in this system, various termination instances are distinguished by adding termination instance identifiers in termination connection configuration descriptions in form of triple of "termination type A, termination type B, direction between termination types A and B" for a general scenario and/or in form of two-tuple of "termination type, maximum number" for a conference scenario and/or in form of triple of "source termination type, destination termination type, maximum number of destination termination types" for a multicast scenario. The instance identifier as an optional parameter is associated with termination types in the triple. Instance Y of termination type X is preferably represented in form of "termination type X [instance identifier Y]."

The MG is further adapted to connect terminations in a context, according to the termination connection indication.

Figure 14:
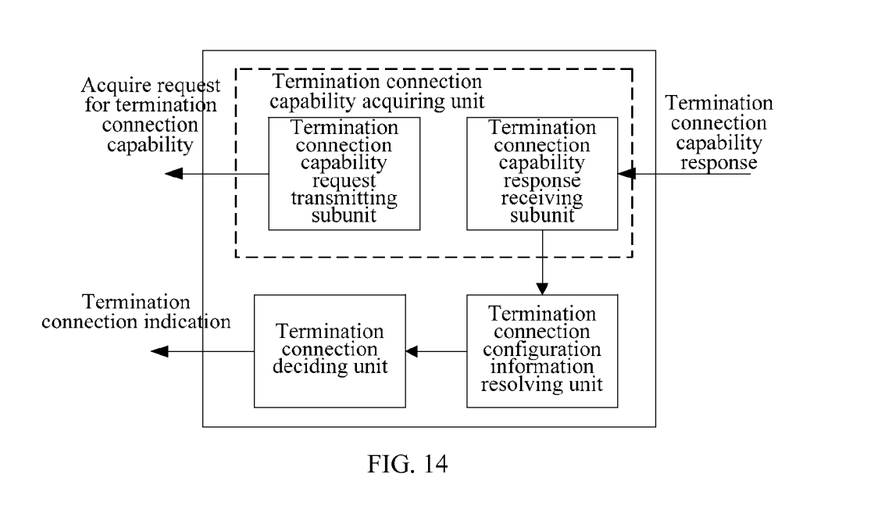
FIG. 14 is a detailed structural diagram of a media gateway controller, according to the fourth embodiment of the present invention.

FIG. 14 is a specific structure diagram of a MGC provided in the present embodiment, which can be applied in the system of the present embodiment. The MGC and MG herein are interacted in a two-way direction. As shown in FIG. 14, the MGC includes a termination connection capability acquiring unit, a termination connection configuration information resolving unit, and a termination connection deciding unit, wherein the termination connection capability acquiring unit includes a termination connection capability request transmitting subunit and a termination connection capability response receiving subunit.

In the MGC, the termination connection capability request transmitting subunit is adapted to transmit a termination connection capability auditing request to the MG. The termination connection capability response receiving subunit is adapted to receive the information on the MG's connection capability for various types of terminations returned by the MG, and the information includes instance identifiers for distinguishing various termination connection configuration instances.

The termination connection configuration information resolving unit is adapted to resolve termination connection capability corresponding to different termination instances from the termination connection capability information according to the instance identifiers.

The termination connection deciding unit is adapted to transmit a connection indication to the MG, according to the termination connection configuration description resolved by the termination connection configuration information resolving unit, when a call connection is required and the MG is instructed to set up termination connections.

Preferably, the MGC in the present embodiment further includes a storage unit, and the termination connection capability acquiring unit stores the information on the MG's connection capability for various types of terminations returned by the MG into the storage unit. The storage unit is adapted to store the information on the MG's connection capability for various types of terminations, and provide it to the termination connection configuration information resolving unit, when a call connection is required.

Figure 15:
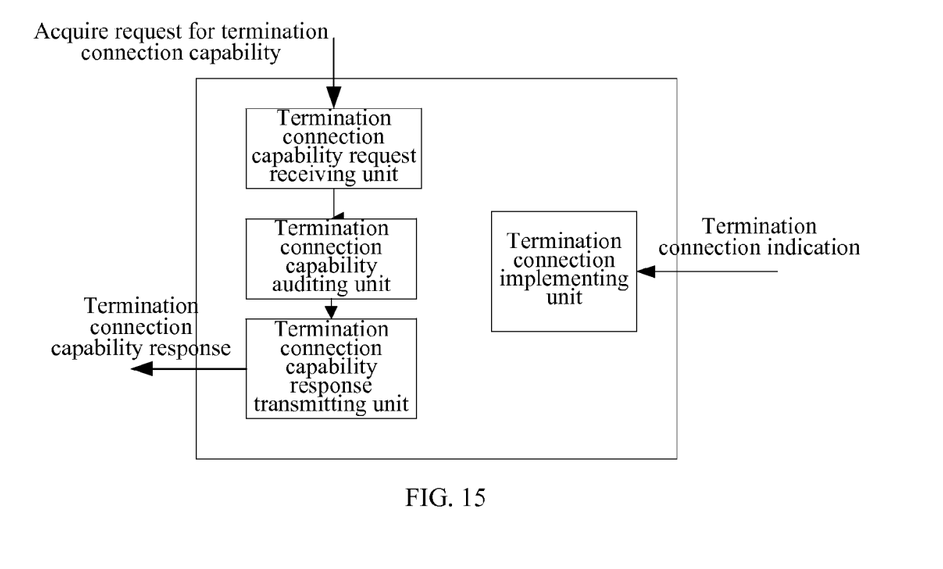
FIG. 15 is a detailed structural diagram of a media gateway, according to the fourth embodiment of the present invention.

FIG. 15 is a specific structure diagram of an MG provided in the present embodiment. As shown in FIG. 15, the MG includes a termination connection capability request receiving unit, a termination connection capability response transmitting unit, a termination connection capability auditing unit, and a termination connection implementing unit.

The termination connection capability request receiving unit is adapted to receive a termination connection capability request sent from the MGC, and forward the termination connection capability request to the termination connection capability auditing unit.

The termination connection capability auditing unit is adapted to acquire connection capability of corresponding termination according to the termination connection capability request sent from the MGC, and generate a termination connection capability response carrying information on termination connection configuration, wherein the information on termination connection configuration includes instance identifier for distinguishing various termination instances.

Also, preferably, various termination instances are distinguished by adding termination instance identifiers in termination connection configuration descriptions in form of triple of "termination type A, termination type B, direction between termination types A and B" for a general scenario and/or in form of two-tuple of "termination type, maximum number" for a conference scenario and/or in form of triple of "source termination type, destination termination type, maximum number of destination termination types" for a multicast scenario. The instance identifier as an optional parameter is associated with termination types in the triple. Instance Y of termination type X is preferably represented in form of "termination type X [instance identifier Y]."

The termination connection capability response transmitting unit is adapted to return the termination connection capability auditing response generated by the termination connection capability auditing unit to the MGC.

The MG may further include a termination connection implementing unit adapted to connect terminations in a context according to the termination connection indication returned from the media gateway controller, wherein the MGC resolves information on termination connection configuration corresponding to different termination instances from the termination connection capability response, according to the instance identifier, and transmits a termination connection command to the MG, according to the information on termination connection configuration.

Also, the information on termination connection configuration in FIGS. 14 and 15 preferably includes a first termination type, a first termination instance identifier, a second termination type, a second termination instance identifier, and a connection direction between the first termination type and the second termination type.

In summary, by extending instance identifiers in the termination connection configuration, when the MGC request to the MG to check connection capabilities for various types of terminations configured by it, in case that one context includes multiple terminations of same type and subtype, MG can feed back termination connection configuration in the corresponding auditing response by adding instance identifiers.

In a word, the above description is only preferred embodiments of the present invention and is not for limiting the scope of the invention. Any modifications, equivalent replacements and improvements within the spirit and principle of the present invention should be contained in the scope of the present invention.

What is claimed is:

1. A method for instructing a media gateway, MG, to carry out termination connections, comprising:
  acquiring by a media gateway controller, MGC, information on the MG's connection capability for various types of terminations; and
  transmitting a connection indication from the MGC to the MG according to the information on the MG's connection capability for various types of terminations, when the MG is instructed by the MGC to carry out termination connections;
  wherein the information on the MG's connection capability for various types of terminations comprises at least one of information on termination connection configuration supported by the MG and information on termination connection configuration not supported by the MG;
  wherein the information on termination connection configuration comprises at least one of:
    any two termination types and a connection direction between terminations of the two termination types; and
    any termination type and a maximum number of terminations of the termination type in a call session scenario involving multiple parties.

2. The method of claim 1, wherein the acquiring by the MGC the information on the MG's connection capability for various types of terminations comprises setting the information on the MG's connection capability for various types of terminations in the MGC in advance, and acquiring by the MGC the information on the MG's connection capability for various types of terminations set in the MGC itself.

3. The method of claim 1, wherein the method further comprises setting the information on the MG's connection capability for various types of terminations in the MG; and
  the acquiring by the MGC the information on the MG's connection capability for various types of terminations comprises transmitting from the MGC to the MG a command for acquiring the information on the MG's connection capability for various types of terminations, and transmitting from the MG the set information on connection capability for various types of terminations to the MGC and storing the set information in the MGC.

4. The method of claim 3, wherein the command for acquiring termination connection capability is an auditing command; and
  the step of transmitting from the MG to the MGC the set information on connection capability for various types of terminations comprises transmitting from the MG to the MGC the information on connection capability for various types of terminations via a response to the auditing command.

5. The method according to claim 1, wherein the termination types comprise: various termination types representing various resource types and/or various termination types corresponding to various specific resources in one resource type.

6. The method according to claim 1, wherein the termination type is provisioned in advance between the MGC and the MG.

7. The method according to claim 1, wherein the information on termination connection configuration comprises at least one of the following three representation forms:
  a termination type and number of the termination type for a conference scenario;
  a source termination type, a destination termination type, and a maximum number of terminations of the destination termination type for a multicast scenario; and
  a first termination type, a second termination type, and a connection direction between the first termination type and the second termination type for a general scenario.

8. The method according to claim 1, wherein the information on termination connection configuration further comprises an instance identifier for distinguishing different termination instances.

9. The method of claim 8, wherein the information on termination connection configuration comprises at least one of the following three representation forms:
  a first termination type, a first termination instance identifier, a second termination type, a second termination instance identifier, and a connection direction between the first termination type and the second termination type for a general scenario;
  a termination type, a termination instance identifier, and a maximum number of terminations of the termination types for a multicast scenario; and
  a source termination type, a source termination instance identifier, a destination termination type, a destination termination instance identifier, and a maximum number of the destination termination types for a conference scenario.

10. A system for instructing a media gateway to carry out termination connections, comprising a media gateway controller, MGC, and a media gateway, MG, wherein:
the MGC is to acquire information on the MG's connection capability for various types of terminations, and transmit a connection indication to the MG, according to the information on the MG's connection capability for various types of terminations, when the MG is instructed by the MGC to carry out termination connections;
wherein the information on the MG's connection capability for various types of terminations comprises at least one of information on termination connection configuration supported by the MG and information on termination connection configuration not supported by the MG;
wherein the information on termination connection configuration comprises at least one of:
any two termination types and a connection direction between terminations of the two termination types; and
any termination type and a maximum number of terminations of the termination type in a call session scenario involving multiple parties; and
the MG is to receive the connection indication transmitted from the MGC.

11. The system of claim 10, wherein the MGC is further adapted to store the information on the MG's connection capability for various types of terminations.

12. The system of claim 10, wherein:
the MGC is further adapted to transmit to the MG a command for acquiring termination connection capability; and
the MG is further adapted to receive the command from the MGC, and transmit the stored information on the connection capability for various types of terminations to the MGC.

13. A media gateway controller, MGC, wherein the MGC comprises a termination connection capability acquiring unit and a termination connection deciding unit, wherein:
the termination connection capability acquiring unit is to acquire information on the connection capability, of a media gateway, MG, for various types of terminations and transmit the information to the termination connection deciding unit; and
the termination connection deciding unit is to transmit a connection indication to the MG, according to the information on the MG's connection capability for various types of terminations, when the MG is instructed by the MGC to carry out termination connections, the connection indication comprising termination connection information that the MG has connection capability;
wherein the information on the MG's connection capability for various types of terminations comprises at least one of information on termination connection configuration supported by the MG and information on termination connection configuration not supported by the MG;
wherein the information on termination connection configuration comprises at least one of:
any two termination types and a connection direction between terminations of the two termination types; and
any termination type and a maximum number of terminations of the termination type in a call session scenario involving multiple parties.

14. The MGC of claim 13, where the MGC comprises a storage unit; and
the storage unit is adapted to store preset information on the MG's connection capability for various types of terminations, and provide the information to the termination connection deciding unit.

15. The MGC of claim 14, wherein the information on the termination connection capability further comprises an instance identifier for distinguishing various termination instances;
the MGC further comprises a termination connection configuration information resolving unit; and
the termination connection configuration information resolving unit is adapted to resolve information on termination connection configuration corresponding to various termination instances from the information on the MG's connection capability for various types of terminations, according to the instance identifier, and transmit the information on termination connection configuration to the termination connection deciding unit.

16. The MGC of claim 13, wherein the termination connection capability acquiring unit comprises a termination connection capability request transmitting subunit and a termination connection capability response receiving subunit, wherein:
the termination connection capability request transmitting subunit is adapted to transmit to the MG a command for acquiring termination connection capability; and
the termination connection capability response receiving subunit is adapted to receive the information on the MG's connection capability for various types of terminations returned by the MG.

17. The MGC of claim 16, wherein the MGC further comprises a storage unit, the storage unit is adapted to store the information on the MG's connection capability for various types of terminations received by the termination connection capability acquiring unit, and provide the information to the termination connection deciding unit.

18. A media gateway, MG, wherein the MG comprises a termination connection capability request receiving unit, a termination connection capability auditing unit, and a termination connection capability response transmitting unit, wherein:
the termination connection capability request receiving unit is to receive a termination connection capability request sent by a media gateway controller, MGC;
the termination connection capability auditing unit is to acquire connection capability of corresponding terminations, according to the termination connection capability request, and generate a termination connection capability response carrying information on termination connection configuration; wherein the information on termination connection configuration comprises at least one of: any two termination types and a connection direction between terminations of the two termination types; and
any termination type and a maximum number of terminations of the termination type in a call session scenario involving multiple parties; and
the termination connection capability response transmitting unit is to return to the MGC the termination connection capability response generated by the termination connection capability auditing unit.

* * * * *